United States Patent [19]

Inoue

[11] Patent Number: 4,491,714
[45] Date of Patent: Jan. 1, 1985

[54] METHOD OF AND APPARATUS FOR ELECTRICAL DISCHARGE MACHINING USING A GAS DISSOLVED WATER LIQUID

[75] Inventor: Kiyoshi Inoue, Tokyo, Japan

[73] Assignee: Inoue-Japax Research Incorporated, Yokohama, Japan

[21] Appl. No.: 400,672

[22] Filed: Jul. 22, 1982

[30] Foreign Application Priority Data

Jul. 24, 1981 [JP] Japan ............... 56-115155

[51] Int. Cl.³ ................................ B23P 1/08
[52] U.S. Cl. .................. 219/69 D; 204/129; 219/69 M
[58] Field of Search .......... 219/69 D, 69 M, 69 V, 219/68, 69 R; 204/129, 130

[56] References Cited

U.S. PATENT DOCUMENTS

| | | | |
|---|---|---|---|
| 3,420,759 | 1/1969 | Inoue | 219/69 D |
| 3,433,729 | 3/1969 | Proskuryakov et al. | 204/129 |
| 3,541,290 | 11/1970 | Isarie | 219/69 D |
| 3,553,415 | 1/1971 | Girard | 219/69 D |
| 3,616,436 | 10/1971 | Haas | 204/129 |
| 3,626,137 | 12/1971 | Bertolasi | 219/69 D |
| 3,928,163 | 12/1975 | Ullmann et al. | 219/69 D |
| 3,939,321 | 2/1976 | Bertrand et al. | 219/69 D |
| 3,994,790 | 11/1976 | Inoue | 204/130 |
| 4,013,863 | 3/1977 | van Osenbruggen et al. | 219/69 D |
| 4,184,931 | 1/1980 | Inoue | 204/129 |
| 4,205,213 | 5/1980 | Inoue | 219/69 W |
| 4,263,112 | 4/1981 | Aylward | 204/129 |

FOREIGN PATENT DOCUMENTS

| | | | |
|---|---|---|---|
| 2056492 | 5/1977 | Japan | 219/69 D |
| 53-121293 | 10/1978 | Japan | 219/69 D |
| 637872 | 5/1950 | United Kingdom . | |
| 821718 | 10/1959 | United Kingdom . | |
| 1369496 | 10/1974 | United Kingdom . | |
| 2015407 | 3/1982 | United Kingdom . | |
| 2103984A | 3/1983 | United Kingdom | 204/129.75 |

Primary Examiner—C. L. Albritton
Assistant Examiner—Geoffrey S. Evans
Attorney, Agent, or Firm—Karl F. Ross

[57] ABSTRACT

A novel EDM method is disclosed in which a gas such as compressed air is dissolved in a water liquid to form a solution which is pumped into the machining gap formed between a tool electrode and a workpiece. An EDM power supply provides a succession of electrical discharges across the gap through the supplied solution to electroerosively remove stock from the workpiece with the decomposition of oxygen and hydrogen gases from the water liquid. The dissolved gas in the solution is liberated in the machining gap upon exposure to the electrical discharges to add to these gases, thereby increasing the electroerosive stock removal. The gas is dissolved into the water in an amount of at least 20% by volume of the oxygen and hydrogen gases normally decomposed from the water liquid by the electrical discharges. An apparatus for executing the method includes a pressure chamber traversed by the pumped flow of the water liquid and having a gas supply inlet through which the compressed gas is introduced for solubilization in the water liquid. The region of the machining gap is preferably enclosed in a second pressure chamber maintained under a superatmospheric pressure to limit the spontaneous liberation of the dissolved gas from the water liquid.

24 Claims, 1 Drawing Figure

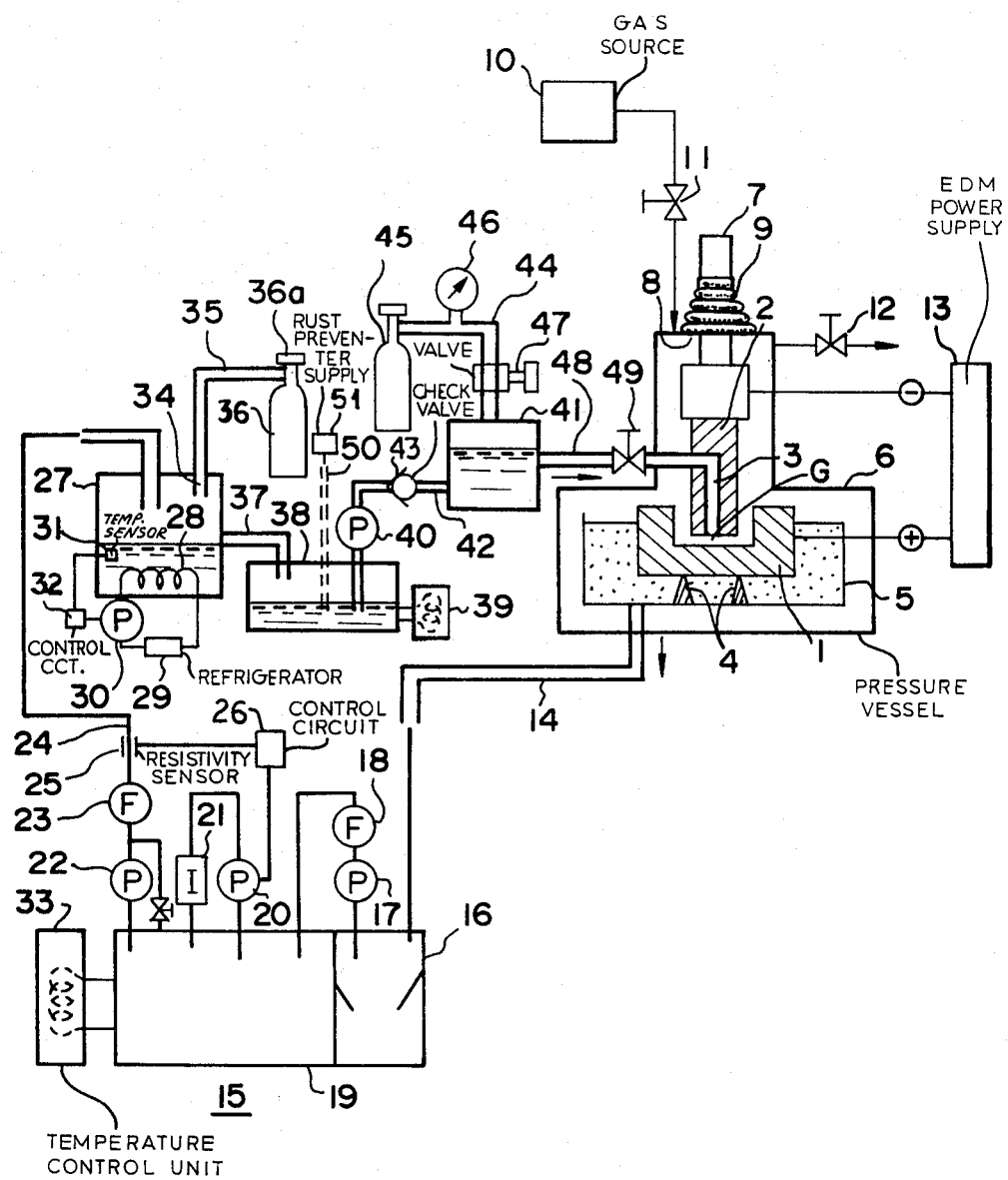

METHOD OF AND APPARATUS FOR ELECTRICAL DISCHARGE MACHINING USING A GAS DISSOLVED WATER LIQUID

FIELD OF THE INVENTION

The present invention relates generally to electrical discharge machining (EDM) and, more particularly, to a new and improved method of and apparatus for the electrical discharge of a workpiece with a tool electrode juxtaposed therewith across a machining gap traversed by a machining liquid.

BACKGROUND OF THE INVENTION

In electrical discharge machnining, it has been commonly recognized that a hydrocarbon liquid such as kerosene or transformer oil provides a highly favorable machining medium which can be introduced or supplied into the machining gap under pressure to serve as the discharge medium, the coolant and the flushing medium. Unfortunately, however, such hydrocarbon liquids are inflammable and must be used with anti-fire, fire-alarm and fire-fighting equipment.

The danger of a fire is entirely eliminated by the use of a water liquid, which not only has widely been used in traveling-wire EDM but is sometimes exploited in sinking-type EDM as well. In addition to its noninflammability, it is readily available, is inexpensive and entails a minimum problem of disposal.

There is, however, a problem with a water machining liquid. Water is less satisfactory in stock removal and machining stability than a hydrocarbon such as kerosene. In the use of water, machining becomes unstable and the removal rate drops noticeably when the duration of discharge pulses is longer than 30 to 50 microseconds. As the pulse duration is lengthened, an arc discharge more likely ensues with a water liquid having a specific resistance in the range between $10^3$ and $5 \times 10^5$ ohm-cm than with a hydrocarbon liquid. Furthermore, some electrolytic actions are inherent and cannot entirely be excluded when an electric current is passed through such a water machining liquid, thus limiting the extent of dielectricity and dielectric gap recovery which are essential in the EDM process and consequently limiting the desired machining stability. In addition, it should be noted that machining instability with water is attributed to its excessive cooling ability.

OBJECTS OF THE INVENTION

Accordingly, the present invention seeks to provide a new and improved EDM method which allows the effective use of a water machining liquid that is noninflammable and eliminates the possibility of a fire and which yet enables a workpiece to be machined with excellent stability and with a removal rate that has not been achieved hitherto with such a liquid and that is comparable with that attainable with a hydrocarbon machining liquid, especially but not exclusively in EDM ranges which entail the use of a discharge pulse duration of at least 30 to 50 microseconds.

An object of the present invention also is to provide an EDM apparatus for carrying out the improved method.

SUMMARY OF THE INVENTION

I have observed that there is a difference in the amount of gases produced in the EDM gap between the use of a hydrocarbon liquid and the use of a water liquid. Thus, it is observed that in EDM ranges designed to yield a surface roughness generally in excess of 10 $\mu$Rmax, for the stock removal of 1 gram, kerosene produces gases in an amount of 1000 cc whereas water only produces gases in an amount of 333 cc. I have now recognized that it is because of this insufficiency of gases produced in the machining gap that a water machining liquid is inferior in removal rate and machining stability to a hydrocarbon liquid and that if the water liquid is adapted in advance and forced by the gap electrical discharges, viz. by absorbing a substantial portion of the discharge energy, to produce an additional amount of gases in the machining gap which can supplement the oxygen and hydrogen gases normally decomposed from water in the water-liquid EDM process, a removal rate and machining stability approaching those with kerosene can be obtained. When a substantial portion of the energy (thermal and formed otherwise) of machining electrical discharges is connected to create a desirable supplemental amount of gases in the machining the tendency to arcing even with a long-duration pulse can be reduced and machining stability substantially improved. Furthermore, the added gases are insulative both electrically and thermally, and hence can increase the dielectric strength, improve the dielectric recovery characteristics and moderate the cooling ability of the water machining medium. I have now discovered that the effective additional production of such gases can be produced in the machining gap when a gas is in advance forcibly dissolved into a water machining liquid.

In accordance with the present invention there is provided, in a first aspect thereof, a method of electrical discharge machining a workpiece with a tool electrode spacedly juxtaposed therewith across a machining gap traversed by a machining liquid, which method comprises: (a) dissolving a gas into a water liquid to produce a solution constituting the machining liuqid: (b) pumping the solution to supply it into the machining gap; and (c) effecting a succession of electrical discharges across the gap through the supplied solution to electroerosively remove stock from the workpiece with the consequential decomposition of said water liquid into oxygen and hydrogen gases in the machining gap while permitting the dissolved gas in the solution to be liberated therefrom only upon contact with the electrical discharges so as to be added to the oxygen and hydrogen gases, thereby increasing the electroerosive stock removal.

The gas may be air and should be dissolved in the water liquid in advance and liberated in the machining gap by electrical discharges in an amount of at least 20% and, preferably, at least 50% in volume (calculated at 1 atm) of the oxygen and hydrogen gases decomposed by the electrical discharges from the water liquid in the machining gap.

The invention is especially advantageous in an EDM process in which the water liquid is adapted to possess a specific resistance ranging between $10^3$ and $5 \times 10^5$ ohm-cm and for a machining operation designed to yield a surface roughness of the machined workpiece in excess of 10 $\mu$Rmax or utilizing a pulse duration of the electrical discharges of at least 30 microseconds.

In order to facilitate dissolution of the gas into the water liquid, it is desirable that the water liquid prior to accepting the gas be cooled to less than a predetermined temperature, that is 20° C., preferably 10° C. and more preferably 5° C.

The gas is preferably dissolved into the water liquid by passing a pumped flow of the water liquid through a volume of the gas compressed under a predetermined pressure, that is at least 2 atms and preferably in excess of 5 atms.

Furthermore, it has been found to be critical to limit the spontaneous liberation of the dissolved gas from the solution issuing from the machining gap. To this end, the method of the invention preferably includes maintaining the region surrounding the machining gap under a superatmospheric gaseous pressure of at least 2 atms and preferably in excess of 5 atms. The solution should be pumped to flow into the machining gap at a volume flow rate of 5 to 10 liters/minute.

The invention also provides, in a second aspect thereof, an apparatus for electrical discharge machining a workpiece with a tool electrode spacedly juxtaposed therewith across a machining gap traversed by a machining liquid, which apparatus comprises: means (a) for dissolving a gas into a water liquid from a supply to produce a solution constituting the machining liquid; pumping means (b) for supplying the solution into said machining gap; and means (c) for effecting a succession of electrical discharges across the machining gap through the supplied solution to electroerosively remove stock from the workpiece with the consequential decomposition of the water liquid into oxygen and hydrogen gases in the machining gap while permitting the dissolved gas in the solution to be liberated therefrom only upon contact with the electrical discharges so as to be added to the oxygen and hydrogen gases, thereby increasing the electroerosive stock removal.

The apparatus should preferably include liquid-treating means for collecting the machining liquid from the region of the machining gap to recover therefrom the water liquid having a predetermined specific resistance and means for cooling the recovered water liquid to less than a predetermined temperature prior to accepting the dissolvable gas. The dissolving means (a) may comprise a pressure chamber having a first inlet for receiving the water liquid which has been cooled and resistivity adjusted from the supply, and a second inlet connected to a source of the dissolvable gas for supplying into the pressure chamber the gas compressed under a pressure to dissolve it into the water liquid therein. Moreover, means is also provided for maintaining the region surrounding the machining gap under a superatmospheric gaseous pressure. The last-mentioned means may comprise a second pressure chamber for enclosing at least portions of the tool electrode and the workpiece including the machining gap and a gas supply for supplying a gaseous pressure medium into the second chamber to establish the superatmospheric pressure therein.

BRIEF DESCRIPTION OF THE DRAWING

These and other features of the present invention as well as advantages thereof will become more readily apparent from a reading of the following description of a certain preferred embodiment thereof when taken with reference to the accompanying drawing the sole FIGURE of which is a diagrammatic cross section with a flow scheme illustrating an apparatus according to the present invention.

SPECIFIC DESCRIPTION

In the drawing a workpiece 1 is shown as being machined with a tool electrode 2 to aquire a cavity complementary in shape thereto. The tool electrode 2 has a fluid passage 3 formed therein which is open to a machining gap G defined between the tool electrode 2 and the workpiece 1. Although only one passage 3 open to the gap G is shown, two or more such passages may be formed in the tool electrode 2 depending on the shape and area of the machining surface thereof.

The workpiece 1 is mounted on a base 4 in a work pan 5 which is, in turn, received in a tightly sealed, rigid, pressure-resistant vessel or receptacle 6. A spindle 7 which carries the tool electrode 2 is led out of the receptacle 6 through an opening 8 formed in the upper wall thereof. A bellows 9 is shown coupling the spindle 7 with the receptacle 6 while hermetically sealing the space inside the latter from the atmosphere. A source 10 of pressure gas is connected to the receptacle 6 via a valve 11. The pressure in the receptacle 6 is adjusted through a vent valve 12.

An EDM power supply 13 for furnishing a succession of electrical pulses of adjustable parameters, i.e. pulse duration, pulse interval and pulse peak current, has one terminal electricaly connected to the tool electrode 2 and the other terminal electrically connected to the workpiece 1 to produce time-spaced electrical machining discharges across the machining gap G in the presence of a machining liquid which in accordance with the present invention is basically constituted by water. The present invention is advantageously used in an EDM operation designed to yield a surface roughness of the workpiece 1 in excess of 10 $\mu$Rmax and hence utilizing the pulse duration of electrical discharges in excess of 30 microseconds.

The machining liquid from the gap G which contains machining chips, sludges and other contaminants and is collected in the work pan 5 is drained via a conduit 14 into a liquid-treatment unit 15. This unit includes a sedimentation tank 16 to allow sludge and chips in the water liquid to be sedimented therein. A clarified upper layer of the water in the sedimentation tank 16 is drawn by a pump 17 through an ultrafine filter 18 into a second tank 19. A pump 20 is provided to circulate the water in the second tank 19 through an ion-exchange cartridge 21. The deionized water in the tank 19 is drawn by a pump 22 through a further ultrafine filter 23 into an outlet conduit 24. A sensor 25 is provided in the conduit 24 to sense the conductivity or resistivity of the outlet water to produce an electrical signal representative thereof. A control circuit 26 is connected to the sensor 25 to compare the signal with a threshold value and, when a deviation occurs, acts on the motor for the pump 20 to initiate circulation of the water in the tank 19 through the ion-exchange cartridge 21 or to modify the rate of the circulation so that the conductivity or resistivity of the water issuing through the outlet conduit 24 may be maintained at a predetermined value, generally in the range between $10^3$ and $5 \times 10^5$ ohm-cm.

The conductivity-adjusted water is led through the conduit 24 into a receptacle 27 for temporary storage therein. The receptacle 27 has a cooling coil 28 immersed in the stored water. The cooling coil 28 is constituted by a coiled heat-exchange tubing having an outer wall in contact with the stored water and an inner passage traversed by a cooling medium such as ammonia or freon. The cooling medium from a refrigerator 29 is driven by a pump 30 to flow through the coil 28, thereby cooling the water in heat-exchanging relationship therewith. The receptacle 27 also has a temperature sensor 31 immersed in the stored water therein to provide a feedback signal to a control circuit 32 for the pump 30 to control the rate of flow of the cooling medium through the coil 28 so that the temperature of the water in the receptacle 27 is held at a predetermined reduced temperature, say 20° C. and preferably 10° C. and more preferably 5° C., or in a predetermined reduced temperature range including such a temperature.

It is desirable that such a temperature-control unit (28–32) be provided, as shown at 33, for the water in the tank 19 of the liquid-treatment unit 15 as well.

The receptacle 27 which is rigid and gas-tight has a gas inlet 34 connected via a conduit 35 to a bomb or vessel 36 containing a compressed gas or a gas such as oxygen nitrogen, carbon dioxide, argon or air (liquefied or not) and under pressure. A valve 36a for the bomb 36 is opened to supply the compressed gas into the receptacle 27 so that the gas under pressure is dissolved into the water therein.

The water having the gas dissolved therein is allowed to flow via a conduit 37 into a second tightly-sealed receptacle 38 again for temporary storage. This receptacle, too, is shown equipped with a temperature-control 39 which may be of the type previously described.

The stored water in the receptacle 38 is drawn by a pump 40 into a high-pressure, third receptacle 41 via a conduit 42 which has a check valve 43. The receptacle 41 on the other hand is connected via a conduit 44 to a bomb or vessel 45 containing a compressed gas or a gas such as oxygen, nitrogen, carbon dioxide, argon or air (liquefied or not) and under pressure. The conduit 44 includes a pressure gauge 46 and a valve 47 which is opened to fill a space within the tightly sealed receptacle 41 with the compressed gas. Furthermore, the receptacle 41 is connected to the fluid passage 3 in the tool electrode 2 via a conduit 48 including a valve 49 which checks the flow reversal and is adjustable to set up a forward flow rate as desired. Thus, with the valve 49 opened and adjusted, the water in the receptacle 38 is pumped through the compressed gas in the receptacle 41 and then through the conduit 48 and the electrode passage 3 to flow into the machining gap G in an adjusted volume flow, that preferably is from 5 to 10 liters/minute. The gaseous pressure in the receptacle 41 is held at not less than 2 atms and, preferably, at least 5 atms. It follows that the gas under pressure in the receptacle 41 dissolves or solubilizes into the water traversing therethrough and that the water having the gas in solution therein is pumped in the regulated volume flow into the machining gap G formed between the tool electrode 2 and the workpiece 1. To facilitate the dissolution or solubilization of the compressed gas into the water passing through the receptacle 41, the water in the preliminary stages, viz. in the reservoirs 19, 27 and 33, should be cooled to a temperature as indicated.

It is desirable that the space within the machining receptacle 6 be at an elevated pressure such that the gas dissolved or solubilized in the water may not be spontaneously liberated in the machining gap G. Thus the pressure in the receptacle 6 should here again be a superatmospheric pressure, e.g. in excess of 2 atms and preferably in excess of 5 atms.

When electrical machining discharges are created between the tool electrode 2 and the workpiece 1 in the presence of the gas-dissolved water traversing the machining gap G, the discharge energy not only causes thermal decomposition of the water component into oxygen and hydrogen but the bubbling or dynamic liberation of the dissolved gas. Thus, the amount of the discharge liberated gas is added to the water decomposed oxygen and hydrogen gases, thus facilitating EDM stock removal. It appears that the increased removal rate is attributed to the fact that the bubbling or dynamic liberation of the gas creates an added mechanical action and further that since it effectively increases the dielectricity of the machining medium, the possibility of a continuous arc discharge which by its nature does not entail stock removal and rather does thermally damage the tool electrode or the workpiece or both is markedly reduced, thus enhancing machining stability.

EXAMPLE

In EDMing a ferrous workpiece to a surface roughness in excess of 10 $\mu$Rmax, the use of kerosene as the machining liquid has been found to produce decomposition gases in an amount of 1000 cc for the stock removal of 1 gram. By comparison, it has been found that the use of a water liquid having a specific resistance of $10^4$ ohmcm with a volume flow rate of 5 to 10 liters/minute through the machining gap produces decomposition gases in an amount of 340 cc for the same stock removal and one is only able to obtain a removal rate at most one third that with kerosene. When the same water liquid except having air dissolved therein at a proportion of 19 cc/liter in accordance with the present invention is supplied into the machining gap with the same volume flow rate as mentioned, it has been found that the water liquid in flowing through the machining gap and when subjected to machining electrical discharges, substantially all the dissolved air is liberated therefrom and that the removal rate is twice as great as with the water without air dissolved.

The reservoir 38 is also shown to be provided with a further inlet 50 for adding to the stored water therein from a supply 51 at least one of a rust-preventing or anti-rusting agent, a liquid lubricant or surfactant and at least one substance selected from the group consisting of liquid hydrocarbons, such as transformer oil and kerosene, silicone oil, ethylene glycol, poly-ethylene glycol and poly-alcohols. These additional liquid components may be optionally used in conjunction with the solution according to the present invention.

What is claimed is:

1. A method of electrical discharge machining a conductive workpiece with a tool electrode spacedly juxtaposed therewith across a machining gap traversed by a machining liquid, the method comprising the steps of:
   (a) dissolving a gas in a water liquid to produce a solution constituting a machining liquid;
   (b) pumping said solution to supply it into a machining gap; and
   (c) effecting a succession of electrical discharges across said gap through said solution to electroerosively remove stock from a workpiece with the consequential decomposition of the water liquid into oxygen and hydrogen gases in said machining gap and simultaneously liberating said dissolved gas in said solution from the solution upon contact with said electrical discharges to add volume to said oxygen and hydrogen gases, thereby increasing said stock removal, said gas being dissolved in said water liquid in an amount of at least 20% in volume of the oxygen and hydrogen gases decomposed by the electrical discharges from the water liquid in said machining gap.

2. The method defined in claim 1 wherein said amount is at least 50% in volume of said oxygen and hydrogen gases.

3. The method defined in claim 1, or claim 2 wherein said water liquid has a specific resistance ranging between $10^3$ and $5 \times 10^5$ ohm-cm and said electrical discharges are adapted to yield a surface roughness of the workpiece of not less than 10 $\mu$Rmax.

4. The method defined in claim 3 wherein said electrical discharges have a pulse duration of at least 30 microseconds.

5. The method defined in claim 1, or claim 3, further comprising the step of cooling said water liquid prior to accepting said gas to less than a predetermined temperature.

6. The method defined in claim 5 wherein said temperature is 20° C.

7. The method defined in claim 5 wherein said temperature is 10° C.

8. The method defined in claim 5 wherein said temperature is 5° C.

9. The method defined in claim 1, or claim 3 wherein step (a) is carried out by passing a pumped flow of said water liquid through a volume of said gas compressed under a predetermined pressure.

10. The method defined in claim 9 wherein said pressure is at least 2 atms.

11. The method defined in claim 9 wherein said pressure is at least 5 atms.

12. The method defined in claim 1, or claim 3, further comprising the step of limiting the spontaneous liberation of said dissolved gas from said solution passing to issue out of said machining gap by maintaining the region surrounding the machining gap under a superatmospheric gaseous pressure.

13. The method defined in claim 12 wherein said gaseous pressure is at least 2 atms.

14. The method defined in claim 12 wherein said gaseous pressure is at least 5 atms.

15. The method defined in claim 1, or claim 2 wherein in step (b) said solution is pumped into said machining gap at a volume flow rate ranging between 5 and 10 liters/minute.

16. The method defined in claim 15 wherein said dissolved gas is air.

17. The method defined in claim 1, or claim 2 further comprising, prior to step (a), the step of adding to said water liquid at least one substance selected from the group which consists of kerosene, transformer oil, silicone oil, ethylene glycol, polyethylene glycol and polyalcohols.

18. The method defined in claim 1, or claim 2, further comprising, prior to step (a), the step of adding to said water liquid an anti-rusting agent.

19. The method defined in claim 1, or claim 2, further comprising step of adding to said water liquid a liquid lubricant.

20. The method defined in claim 1, or claim 2, further comprising the step of adding to said water liquid a surfactant.

21. An apparatus for electrical discharge machining a conductive workpiece with a tool electrode spacedly juxtaposed therewith across a machining gap traversed by a machining liquid, the apparatus comprising:
   means (a) for dissolving a gas into a water liquid from a supply to produce a solution constituting a machining liquid;
   pumping means (b) for supplying said solution into said machining gap;
   means (c) for effecting a succession of electrical discharges across said machining gap through said solution to electroerosively remove stock from a workpiece with the consequential decomposition of said water liquid into oxygen and hydrogen gases in said machining gap while permitting said dissolved gas in the solution to be liberated therefrom upon contact with the electrical discharges to add to the oxygen and hydrogen gases, thereby increasing said electroerosive stock removal, said gas being dissolved in said water liquid in an amount of at least 20% in volume of the oxygen and hydrogen gases decomposed by the electrical discharges from the water liquid in said machining gap;
   liquid-treatment means (d) for collecting said machining liquid from the region of said machining gap to recover therefrom the water liquid having a specific resistance in a predetermined range; and
   means (e) for cooling the recovered water liquid to less than a predetermined temperature prior to feeding into said means (a).

22. The apparatus defined in claim 21 wherein said means (a) comprises a pressure chamber having a first inlet for receiving the water liquid cooled and resistivity-adjusted from said supply, and a second inlet connected to a source of said gas for supplying into said chamber said gas under a pressure to dissolve the supplied gas into said water liquid therein.

23. The apparatus defined in claim 22, further comprising means (f) for maintaining the region surrounding said machining gap under a superatmospheric gaseous pressure.

24. The apparatus defined in claim 23 wherein said means (f) comprises a second pressure chamber for enclosing at least portions of said tool electrode and said workpiece including said machining gap and a gas supply for supplying a gaseous pressure medium into said second chamber to establish said superatmospheric pressure therein.

* * * * *